United States Patent [19]

Bohanan et al.

[11] Patent Number: 5,676,984
[45] Date of Patent: *Oct. 14, 1997

[54] FAT FREE CREAM CHEESE PRODUCT AND PROCESS FOR PREPARATION THEREOF

[75] Inventors: Montgomery A. Bohanan, Grover; C. Gordon Brown; John H. Meilinger, both of St. Louis, all of Mo.

[73] Assignee: Raskas Foods, Inc., Clayton, Mo.

[*] Notice: The term of this patent shall not extend beyond the expiration date of Pat. No. 5,470,593.

[21] Appl. No.: 562,669

[22] Filed: Nov. 27, 1995

Related U.S. Application Data

[63] Continuation-in-part of Ser. No. 199,622, Feb. 22, 1994, Pat. No. 5,470,593.

[51] Int. Cl.[6] ............................................. A23C 19/076
[52] U.S. Cl. ................................ 426/34; 426/38; 426/42; 426/43; 426/519; 426/522; 426/582; 426/654
[58] Field of Search ................................ 426/32, 42, 43, 426/582, 519, 522, 38, 654, 34

[56] References Cited

U.S. PATENT DOCUMENTS

| | | | |
|---|---|---|---|
| 2,160,159 | 5/1939 | Lundstedt et al. | 99/117 |
| 2,387,276 | 10/1945 | Link | 99/116 |
| 3,852,158 | 12/1974 | Anderson et al. | 195/100 |
| 3,929,892 | 12/1975 | Hynes et al. | 426/582 |
| 4,244,983 | 1/1981 | Baker | 426/582 |
| 4,379,175 | 4/1983 | Baker | 426/582 |
| 4,724,152 | 2/1988 | Baker et al. | 426/335 |
| 4,968,512 | 11/1990 | Kharrazi | 426/40 |
| 5,079,024 | 1/1992 | Crane | 426/573 |
| 5,108,773 | 4/1992 | Smith et al. | 426/582 |
| 5,180,604 | 1/1993 | Crane et al. | 426/582 |
| 5,215,778 | 6/1993 | Davison et al. | 426/582 |
| 5,395,630 | 3/1995 | Gamay | 426/39 |
| 5,470,593 | 11/1995 | Meilinger et al. | 426/36 |

OTHER PUBLICATIONS

White (1993), in *Low Calorie Foods Handbook*, edited by Aaron Altschul, Chapter 12, Section B, pp. 259–261.

*Primary Examiner*—Helen Pratt
*Attorney, Agent, or Firm*—McDonnell Boehnen Hulbert & Berghoff

[57] ABSTRACT

A process and apparatus are provided for preparing a fat free cream cheese product which approximates the flavor and consistency of traditional full fat cream cheese. According to the process of the invention, a pasteurized mixture comprising skim milk fortified with caseinate is inoculated with a bacterial starter culture containing acid-producing and flavor-producing organisms and fermented at a temperature ranging between about 68° F. and about 110° F. until the mixture reaches a pH 4.7 and 5.0. Thereafter, the fermented mixture is cooled to 40° F. and held at that temperature for a period ranging between about 24 and about 96 hours. The resulting mixture is then blended with dry cottage cheese curd or cultured skim milk curd and an emulsifying salt and allowed to set quiescently for a period ranging between 15 and 60 minutes. The mixture is subjected to a first heating step to a temperature between 130° F. and 160° F. during which heating period bulking agents, preservatives, coloring agents, sugar and salt are added, followed by a second heating step at a temperature of between 150° F. and 175° F. A stabilizing hydrocolloid is slowly added during the second heating step. The mixture is then activated by vigorous mixing, carrageenan and starch are added to the mixture and the product is brought to a temperature between 160° F. and 180° F. during a third and final heating step. The product is then homogenized. The resulting fat free cream cheese product has a water content ranging between about 70% wt. and 77% wt., a pH level ranging between about 4.7 and about 5.3, lactose in an amount ranging between about 3.0% wt, and about 9.0% wt, and a casein content ranging between about 11.0% wt. and about 15.5% wt.

22 Claims, 1 Drawing Sheet

FAT FREE CREAM CHEESE PRODUCT AND PROCESS FOR PREPARATION THEREOF

CROSS-REFERENCE

This is a continuation-in-part of U.S. patent application Ser. No. 08/199,622, filed Feb. 22, 1994 now U.S. Pat. No. 5,470,593, issued Nov. 28, 1995.

FIELD OF THE INVENTION

This application relates to a process and apparatus for manufacture of a firm fat free cream cheese which exhibits the flavor and texture of traditional full fat cream cheese.

BACKGROUND OF THE INVENTION

Cream cheese is a spreadable, mild, uncured cheese which is distinguished from other cheese varieties in terms of its flavor and spreadability. The distinctive flavor of traditional cream cheese, referred to as a "cultured" or "diacetyl" flavor, is derived from fermentation of cream and milk with a bacterial starter culture containing two types of organisms which produce lactic acid (lactococcus organisms) and flavor compounds (leuconostoc and diacetylactis organisms). Butterfat, in a minimum amount of 33% by weight, is required in traditional cream cheese to enhance the cultured flavor and to provide a rounder, fuller flavor in the final product. Furthermore, butterfat is mostly responsible for the soft spreadability characteristics of traditional cream cheese. A process for manufacture of traditional cream cheese is described in U.S. Pat. No. 2,387,276.

While the presence of butterfat is important in dairy products for flavor and texture, increased consumer health awareness has generated a demand for dairy products having less fat and fewer calories than their traditional counterparts. In response, the dairy industry has developed a number of processes to produce low fat or nonfat dairy products including cream cheese products. See, for example, U.S. Pat. Nos. 4,724,152 and 3,929,892 for processes for the manufacture of low fat cream cheese and 5,079,024 and 5,180,604 for processes for the manufacture of fat free cream cheese. While the aforementioned processes are useful in producing low-fat or fat free cream cheese products, these processes could be improved.

Conventional processes for producing fat free cream cheese products suffer from a number of deficiencies. One major deficiency is that the soft consistency of the fat free product produced by processes described to date is unacceptable for packaging the product into bar shaped forms such as bar shaped cream cheese packaged in pouches encased in paper cartons. This package configuration is traditionally sold in eight ounce units for retail trade and three pound units for food service trade. Another deficiency is that these processes generally produce products which fail to approximate the flavor and texture of traditional cream cheese. Moreover, complicated, cumbersome and inefficient apparati are typically employed to accommodate the extensive mixing, shearing and heating steps required in these processes. U.S. Pat. No. 5,079,024, for example, describes a process for manufacturing a fat free cream cheese product which requires an apparatus which includes two homogenizers as well as three separate mixing vessels in sequence. These vessels provide a specific degree of agitation and shear at successive points in the process. Similarly, U.S. Pat. No. 5,180,604 describes a process for making a fat free cream cheese in an apparatus which requires only one vessel. The apparatus, however, is severely limited with respect to the amount of product produced per batch. Accordingly, there is a need in the art for an efficient process for producing a firm fat free cream cheese product which closely resembles traditional cream cheese in flavor and texture.

SUMMARY OF THE INVENTION

The present invention relates to a process for the manufacture of a firm fat-free cream cheese which exhibits the flavor and texture of traditional full fat cream cheese.

According to this invention, a pasteurized mixture comprising skim milk and one or more casein-containing fortification agents, e.g., caseinate, is inoculated with a dairy starter culture having acid- and flavor-producing organisms. The inoculated mixture is fermented until it reaches a pH ranging between about 4.7 and about 5.0 and has a titratable acidity ranging between about 1.2% and about 1.6%. Thereafter, the fermented mixture is transferred into a processing vessel, cooled to about 40° F. and held at this temperature for a period ranging between about 24 and about 96 hours to produce a flavor-rich precheese base. It has been discovered that by fermenting the mixture to the aforementioned pH and acidity ranges and by holding the fermented mixture at the aforementioned temperature and periods, a fat free cream cheese product can be produced which has a cultured flavor similar to that of traditional cream cheese.

Thereafter, the precheese base is transferred into a liquifying vessel and cottage cheese curd (or other cultured skim milk solids) and an emulsifying salt are then blended into the precheese base. The mixture is held for approximately 30 minutes at a temperature ranging between about 40 and about 80° F. The product is then heated to about 145° F. During this first heating period, a number of dry ingredients are added and mixed into the precheese base which contributes to the final product's firmness and flavor. These include bulking agents such as nonfat dry milk, caseinates, or other milk solids; maltodextrin or corn syrup solids; preservatives such as propianates or sorbates; coloring agents such as titanium dioxide; sugar; salt; and vitamin A. After these dry ingredients have been added and the first heating period has ended at about 145° F., a second heating period commences which raises the temperature of the product to about 160° F. During the second heating period, xanthan gum is gradually added. Once the mixture has reached 160° F. and the xanthan has been added, the liquifying vessel is turned on high speed and the mixture is blended at high shear for several minutes, e.g., about three to ten minutes. Toward the end of the high shear mixing, stabilizers such as carrageenan and starch are added. After the high shear mixing period, the liquifier is turned to low speed and the product is brought to its final temperature of about 165° F. After all ingredients are properly blended, the product is homogenized, packaged, and refrigerated.

The fat-free cream cheese product produced by the process of the present invention possesses a flavor very similar to that of traditional full-fat bar cream cheese, and is high in water soluble solids, e.g., lactose, and casein. High amounts of water soluble solids in the final product are desirable for promoting and enhancing the spreadability of fat-free cream cheese and for providing a texture which closely resembles traditional full fat cream cheese. High amounts of casein are desirable in the product for producing a fat-free cream cheese product with sufficient firmness for packaging into bar shaped forms.

The process of the present invention preferably employs a simple and economical two-vessel apparatus which provides the necessary mixing, shearing, and heating processing steps without significantly sacrificing the amount of product produced per batch.

Accordingly, it is an object of the invention to provide a process for the manufacture of a fat free cream cheese product having a cultured flavor which closely resembles traditional full fat cream cheese and a suitable firmness for certain types of packaging.

It is another aim of the present invention to provide a simple apparatus for manufacture of a fat free cream cheese product which provides the necessary mixing, shearing, and heating without significantly sacrificing the amount of product produced per batch.

These and other objectives of the invention will be apparent in light of the detailed description below.

DETAILED DESCRIPTION OF THE INVENTION

Figure 1:
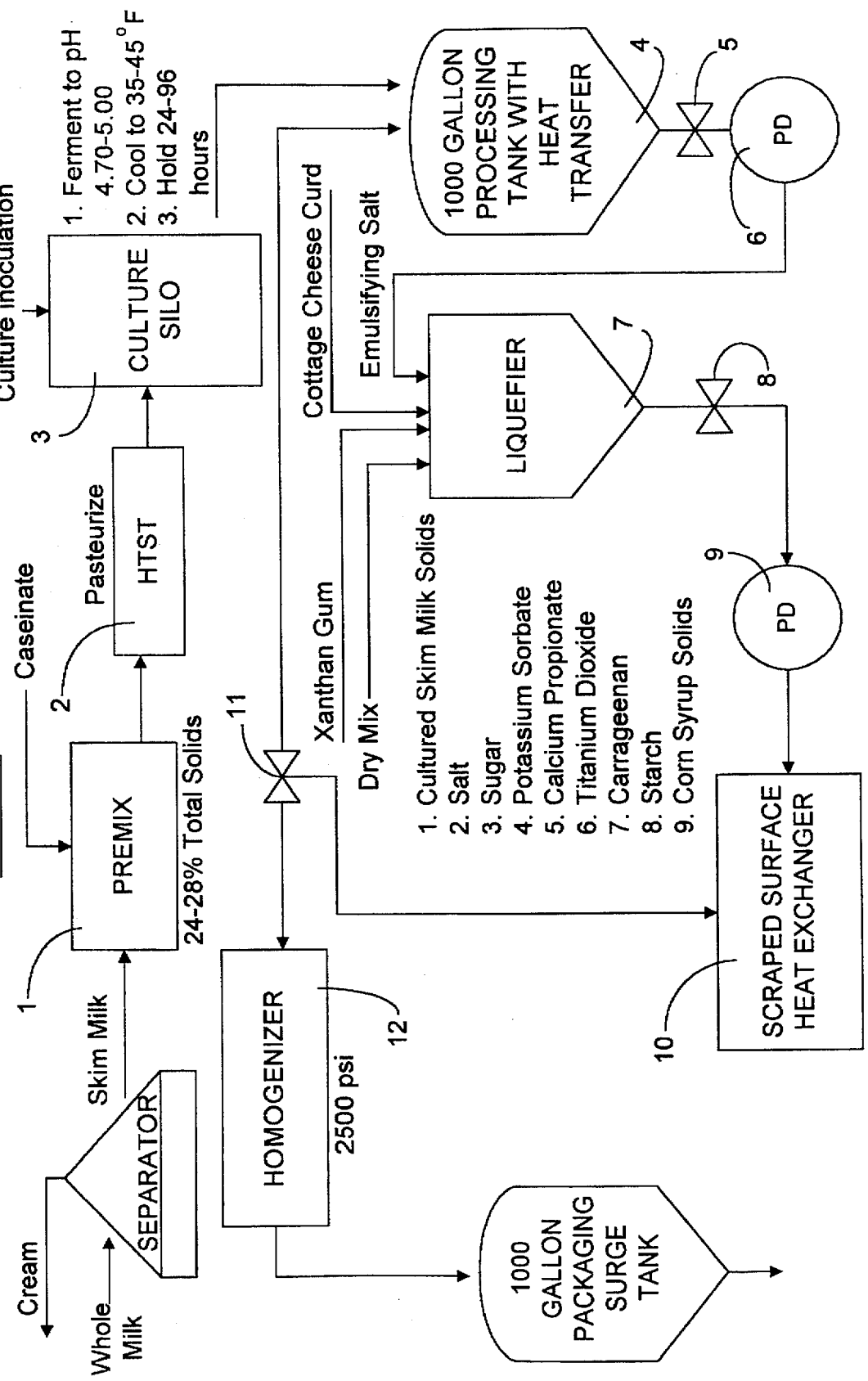
FIG. 1 illustrates the inventive process for making a fat-free cream cheese which employs an apparatus comprising a processing tank (4) and a liquifier tank (7). The processing tank (4), which also functions as a product reservoir, is connected via conduits to the liquifier tank (7) and scraped surface heat exchanger (10). The liquifier tank blends precheese base with additional ingredients and serves as a high shear point during fat free cream cheese manufacture. The scraped surface heat exchanger reduces the amount of product heating time and reduces the exposure of the product to unnecessary agitational shear which diminishes product firmness.

All patents referred to in this application are incorporated by reference in their entirety.

According to the present invention as illustrated in FIG. 1, a precheese base may be prepared by passing whole milk through a separator (1) and fortifying the resultant skim milk with a casein-containing fortification agent to obtain a nonfat milk mixture having a dry solids content ranging between about 24% wt. and about 28% wt., preferably about 26% wt., based on the weight of the mixture. The casein content generally ranges between about 10% wt. and about 14% wt., preferably ranging between about 11% wt. and about 13% wt. Fortification agents increase the protein content in the precheese base and thereby result in a final product having a sufficient degree of firmness suitable for packing into bar shaped forms. Caseinate, a milk protein, is preferred as the fortification agent because of its lower buffering capacity which allows the base to reach its proper pH earlier during the fermentation step. If desired, other fortification agents such a nonfat dry milk, ultrafiltered skim milk, and condensed skim, alone or in combination with each other, e.g. caseinate and nonfat dry milk, can be used to increase casein content in the precheese base.

The mixture is then pasteurized (2), cooled to a temperature ranging between about 68° F. and about 78° F., preferably between about 72° F. and about 74° F.

The cooled mixture is then transferred to a culture silo (3) and inoculated with a dairy bacterial starter culture such as that typically used in cream cheese manufacture. Suitable but non-limiting examples of bacterial starter cultures are described, for example, in Gilliland, S. E. (ed.), 1985, *Bacterial Starter Cultures for Foods*, CRC Press, Boca Raton, Fla. Bacterial starter cultures are available from a number of commercial sources such as Quest International, Sarasota, Fla; Rhone-Poulenc, Madison, Wis.; Chr. Hansen's Laboratory, Inc., Milwaukee, Wis.; Pfizer, Inc., Milwaukee, Wis.; and Sanofi Bio-Industries, Waukesha, Wis. In practicing this invention, conventional dairy starter cultures containing an acid producing organism (*Lactococcus lactis* subsp. *lactis; Lactococcus lactis* subsp. *cremoris; Streptococcus thermophilus*) and at least one species of flavor-producing organisms (*Leuconostoc mesenteroides* subsp. *cremoris, Leuconostoc lactis* and *Lactococcus lactis* subsp. *lactis* biovar diacetylactis) are used. The ratio of acid-producing organisms to flavor producers may vary accordingly depending on preference, however, the ratio generally ranges between about 75% and about 85% acid producers to about 15% and about 25% flavor producers. In practicing this invention, the preferred dairy starter culture contains *Lactococcus lactis* subsp. *cremoris; Leuconostoc mesenteroides* subsp. *cremoris;* and *Lactococcus lactis* subsp. *lactis* biovar diacetylactis.

The inoculated mixture is then fermented at a temperature ranging between about 68° F. and about 110° F., preferably between about 72° F. and about 74° F., until the pH of the mixture drops to a pH value ranging between about 4.5 and about 5.5, preferably between about pH 4.7 and about pH 5.0. At pH values below 5.7, the flavor-producing organisms are most active and produce substantial amounts of desirable flavoring compounds. The fermentation time will vary according to the dry solids content of the nonfat milk mixture and selection of fortification agent as this will affect the buffer capacity of the base. In general, the fermentation time ranges between about 12 and about 28 hours, usually between about 16 and about 24 hours when the dry solids content of the base ranges between about 24% wt. and about 28% wt.

Once the fermented mixture reaches a value within the aforementioned pH range, the resulting fermented precheese base is cooled to a temperature ranging between about 34° F. and about 50° F., preferably ranging between about 35° F. and about 45° F., and held, without agitation for a minimum period ranging between about 24 and about 96 hours. In practicing this invention, it is preferred that the cooled, fermented precheese base be held for a period ranging between about 24 and about 96 hours, preferably between about 48 hours and about 72 hours, to allow sufficient time for the flavor-producing organisms to generate flavor compounds. Thereafter, the fermented precheese base is transferred from the culture silo (3) to a processing tank (4).

The processing tank (4) has agitation as well as heating and cooling capabilities and a general capacity ranging between about 500 and about 2,000 gallons, usually ranging between about 500 and about 1000 gallons. For economic reasons, processing tanks smaller than 500 gallons are not normally used. As shown in FIG. 1, processing tank (4) is connected to valve (5) which in turn is connected to a positive displacement pump (6). Positive displacement pump (6) delivers product to the liquifying tank (7).

In practicing the process of the present invention, processing of the product or its intermediates, e.g., agitation, shearing, heating, or cooling, may be achieved by simply recirculating the material between the processing tank (4) to the liquifier tank (7) via a recirculation loop comprised of a processing tank (4), valve (5), PD pump (6), liquifier tank (7), valve (8), PD pump (9), scraped surface heat exchanger (10) and valve (11). A number of benefits can be obtained by the two-vessel apparatus of the present invention. By allowing the processing tank to serve as the product reservoir, the liquifier may function as a high shear point in the recirculation loop rather than the product reservoir itself. Thus, proper shearing, agitation, and temperature control can be achieved without sacrificing the size of the batch being processed. Additionally, the apparatus eliminates the need for multiple liquefying vessels thus reducing capital investment.

The apparatus of the invention employs processing and liquifier tanks which are typically used to process dairy products. Processing tanks are generally stainless steel mixing vessels which are fitted with temperature control means, e.g., water or steam jackets, and with agitation means which provide thorough mixing. Suitable processing tanks may be purchased from Walker (New Lisbon, Wis.), APV Crepaco (Lake Mills, Wis.), Cherry Burrell (Louisville, Ky.), and Mueller (Springfield, Mo.). A preferred processing tank for use in the invention is Walker (model no. P/Z-K/T-34).

Liquifier tanks are designed to provide high shear and vigorous mixing when required due to high product viscosity. The liquifier tanks employed in the invention are preferably blender type mixers, e.g., a Breddo mixer (model no. LORWWSS Breddo (Kansas City, Kans.)), such as the one described in U.S. Pat. No. 5,180,604. Other suitable liquifier tanks may be purchased from APV Crepaco, Mueller, Silverson (East Longmeadow, Mass.), and Stephan (Columbus, Ohio). Any type of suitable positive displacement (PD) pumps can be used. Non-limiting examples of PD pumps include Tri-Clover (model no. TSR5NLD-30MDUOW-A, Tri-Clover, Kenosha, Wis.), APV Crepaco, Bran & Luebbe (Buffalo Grove, Ill.), Fristam (Middleton, Wis.), Sine Pump (Arvada, Colo.) and Waukesha (Delavan, Wis.).

The scraped surface heat exchanger (10) serves to reduce the amount of time required to heat the product and reduces the product's exposure to unnecessary agitation and shear. This is particularly important when firmness is required in the final product. Suppliers of scraped surface heat exchangers include APV Baker (Grand Rapids, Mich.), Chester-Jensen (Chester, Pa.), Niro Hudson (Hudson, Wis.), APV Crepaco, and Damrow (Fon-du-Lac, Wis.).

The selection of valves used in the apparatus employed in the invention is not critical and any suitable type of valve typically used in dairy processing may be used. The diameter and shape of interconnecting conduits are not critical to the invention, however the selection of the appropriate conduit depends on consideration of the type of pump used, the flow rate and type of valve used.

The fermented precheese base is introduced into the processing tank (4) in an amount generally ranging between about 25% wt. and about 55% wt., preferably between about 35% wt. and about 45% wt., based on the weight of the final product. The precheese base is then recirculated via conduits through pump (5), valve (6), the liquifier tank (7), valve (8), positive displacement high shear pump (9), scraped surface heat exchanger (10), and valve (11) and back into processing tank (4). Recirculation is generally performed at a temperature ranging between about 40° F. and about 70° F., preferably between about 45° F. and about 50° F. As recirculation proceeds, dry cottage cheese curd is added into the liquifier tank (7) in an amount ranging between about 30% wt. and about 70% wt., preferably between about 40% wt. and about 60% wt., based on the weight of the final product. If desired, an equivalent amount of cultured skim milk solids may be used as a substitute for cottage cheese curd.

After the curd has been sufficiently blended, an emulsifying salt is introduced into the liquifier tank (7) and recirculation of the mixture proceeds for a time ranging between about 3 minutes and about 15 minutes, preferably about 5 minutes. The emulsifying salt is one that is typically used in the manufacture of processed cheese such as sodium citrate, sodium tripolyphosphate, or disodium phosphate. A particularly preferred emulsifying salt is sodium tripolyphosphate. The emulsifying salt is added in an amount generally ranging between about 0.25% wt. and about 2.0% wt., preferably ranging between about 0.50% wt. and about 1.00% wt., based on the weight of the final product. After about five minutes, the recirculation loop is shut off and the mixture is allowed to sit quiescently for a period ranging between about 15 minutes and about 60 minutes, preferably about 30 minutes, so as to allow the emulsifying salt to interact with the protein.

After the period of quiescence, the PD pumps (6) and (9) as well as the scraped surface heat exchanger (10) and the liquifier tank (7) are started and recirculation of the product recommences. During this recirculation period, the jackets of the liquifier tank (7), scraped surface heat exchanger (10), and processing tank (4) serve to heat the product to a first predetermined processing temperature ranging between about 140° F. and about 160° F., preferably about 145° F., at a heating rate of between about 2° F./min. and about 5° F./min.

During this first heating period, dry ingredients are added to the recirculating product at the liquifier tank (7). The dry ingredients added during the first heating period perform several functions in the final product. Suitable, but non-limiting dry ingredients added during the first heat up period include bulking agents such as milk solids (nonfat dry milk, whey proteins, caseinates, buttermilk solids); bulking agents from other sources (corn syrup solids, maltodextrin); stabilizing hydrocolloids (modified food starch, agar, alginate, locust bean gum, cellulose gum); sweeteners such as sucrose, corn syrup or dextrose; food preservatives (calcium propionate, potassium sorbate, sorbic acid); and salt. These ingredients, in dry form, can be added separately or preferably as a mixture. When carrageenan is used, however, it is preferably added last and as a separate ingredient. The Table below lists the preferred dry ingredients as well as general and preferred amounts of dry ingredients used relative to the total weight of the final product:

| PREFERRED BY INGREDIENT | % WT. OF FINAL PRODUCT | |
| --- | --- | --- |
| | Preferred Ranges | General Ranges |
| Buttermilk solids | 1.0–5.0 | 0–10.0 |
| Sodium chloride | 0.2–1.0 | 0.2–2.0 |
| Sucrose | 0.2–1.1 | 0.2–2.0 |
| Potassium sorbate | 0.05–0.1 | 0.05–0.2 |
| Calcium propionate | 0.05–0.1 | 0.05–0.2 |
| Titanium dioxide | 0.2–1.0 | 0.2–1.0 |

Optional ingredients such as coloring agents and vitamins may be added during the initial heat-up phase. Acceptable coloring agents include titanium dioxide and annatto. Vitamin A, in a suitable form, e.g. a palmitate salt, is preferably added to the recirculating mixture to restore the vitamin A level in the product to the level which is typically found in regular cream cheese.

After the previously described dry ingredients have been added during the initial heating period and the product has attained a temperature of 145° F., the second heating period commences. During the second heating period, the product temperature is increased from 145° F. to 160° F. During the second heating period, stabilizing hydrocolloid is gradually added and dispersed into the product. An example of a stabilizing hydrocolloid which is particularly suited for addition during the second heat-up period is xanthan gum.

After the product reaches a temperature of 160° F. at the end of the second heat-up period, additional stabilizing hydrocolloids are added and the liquifier speed is increased. Non-limiting stabilizing hydrocolloids suitable for addition at this point include carrageenan alone or in combination with modified food starch. The presence of modified food starch, in addition to carrageenan, is preferred for the firm bar product. The amount of stabilizing hydrocolloid used broadly ranges between about 0.10% wt. and 2.0% wt., preferably ranging between about 0.10% wt. and about 1.00% wt., based on total weight of the final product. The liquifier mixing speed during this period generally ranges between about 1600 and 3600 rpm, preferably about 2400 rpm.

Thereafter, the liquifier tank (7) is turned to a relatively low speed as the third and final heating step commences. During the third heating step, the processing temperature reaches a value ranging between 160° F. and about 170° F., preferably about 165° F. In producing a nonfat cream cheese of sufficient firmness for packaging into bar shaped forms, it is preferred that the final temperature of this third heating period be kept at about 165° F. to avoid excessive disruption of the protein structure and concomitant loss of firmness. The liquifier low speed ranges between about 800 and about 1800 rpm, preferably about 1200 rpm.

At the end of the third and final heating period and after all of the dry ingredients are thoroughly blended, valve (11) is repositioned, and the product is finally passed through the homogenizer (12) and homogenized at a total pressure ranging between about 1,500 and about 3,000 psi, preferably about 2,500 psi. After homogenization, the final product is transferred to a surge tank, packaged, and cooled.

The resulting fat free cream cheese product has a water content generally ranging between about 70% wt. and about 77% wt., usually between about 72% wt. and about 75% wt., and a pH value ranging between about 4.9 and about 5.2, preferably between about 4.9 and about 5.1. The final product is preferably acidic so as to discourage the potential growth of contaminants such as yeast, mold, and some pathogens due to the relatively high water content of the product relative to traditional cream cheese.

The final product preferably also has a high percentage of water-soluble solids. Water-soluble solids contribute to the spreadability of fat-free cream cheese and provide a texture which closely resembles traditional full fat cream cheese. The final product generally has a water-soluble solid content ranging between about 12.0% wt. and about 18.0% wt., preferably between about 12.0% wt. and about 15.0% wt. Lactose, the main component of the water-soluble solids, is generally present in the final product in an amount ranging between about 3.0% wt. and about 9.0% wt. The firm product preferably contains lactose in an amount ranging between about 3.0% wt. and about 7.5% wt. The soft product preferably contains lactose in an amount ranging between about 5.0% wt. and about 9% wt.

The firmness of the final product is attributable to casein content. Thus, high casein content results in a firmer product. For nonfat cream cheese product suitable for packaging into bar shaped forms, the casein content generally ranges between about 13.0% wt. and about 15.5% wt., preferably between about 13.5% wt. and about 14.5% wt. based on the final product. For nonfat cream cheese product suitable for packaging into plastic tubs, the casein content generally ranges between about 11.0% wt. and about 13.0% wt., preferably between about 11.5% wt. and about 12.5% wt. based on the final product.

An important textural characteristic of the product produced by this invention is its firmness which allows it to be packaged into bar-shaped forms. As defined herein, the "firmness" of a cheese is its resistance to deformation or penetration by an applied force. For example, if equal forces are applied to two cheese samples that are different in firmness, the firmer cheese will be deformed or penetrated less. Instruments called penetrometers are available that quantitate the firmness of a cheese by applying a known, constant force (a weighted cone or needle) to the surface of the cheese for a specified time. The distance that the cone or needle penetrates into the cheese is then measured and the firmness of the cheese is expressed in terms of the extent of penetration. The final product produced by the process of the present invention has a firmness generally ranging between about 140 and 250 tenth millimeters, preferably about 140 and about 210 tenth millimeters. The aforementioned ranges were determined by using a Precision Scientific Universal Penetrometer(#73510) equipped with a 102.5 gram aluminum cone and 150 grams of additional weight to measure the firmness of the cheese samples. Samples are tested at refrigerated temperature (35–40° F.). Force (the weighted cone) is applied to the cheese surface for 15 seconds. Firmness is expressed as the number of tenths of millimeters that the cone penetrates into the sample tested.

The following example illustrates the invention but does not serve to limit its scope.

EXAMPLE 1

PREPARATION OF FIRM FAT-FREE CREAM CHEESE BAR BY THE INVENTIVE PROCESS

In this Example, a firm fat free cream cheese bar having high levels of lactose and casein was prepared by the process of the present invention. The target range for lactose in this example is 4% wt. to 5% wt., based on the weight of the final product. The target range for casein is 13.0% wt. to about 15.5% wt.

Whole milk (2741 lbs.) was separated into cream and skim milk using a mechanical skim separator. The separated skim milk (2484 lbs.) was then fortified with the caseinate to a solids content of 26.0% wt., and the resulting mixture was pasteurized then cooled to 72° F. The resulting material (3083 lbs.) was then transferred into a culture silo. A commercial dairy starter culture containing *Lactococcus lactis* subsp. *cremoris, Leuconostoc mesenteroides* subsp. *cremoris*, and *Lactococcus lactis* subsp. *lactis* biovar diacetylactis (2 % wt.) was added to the skim milk mixture and fermentation was allowed to proceed at 72° F. until the pH reaches 4.9. This process took about 16 hours. Thereafter, the fortified skim milk was cooled to 40° F. and was held at this temperature for 24 hours for proper flavor development. This resulted in a flavor-rich material which will be referred to here as a precheese base.

Precheese base (3083 lbs) was introduced into a 1000 gallon processing tank (4) (Walker, model P/Z-K/T-34) which was connected to a liquifier tank (7) (volume 300 gal., Breddo, model LORWWSS) and a scraped surface heat exchanger (10) (APV Crepaco, Model No. 2HD672) in a recirculating loop configuration as shown in FIG. 1. The liquifier tank (7) was turned on low speed (1200 rpm). The scraped surface heat exchanger was turned on low speed, but without heat in the jacket as recirculation of the precheese base commences. Dry cottage cheese curd (4500 lbs) having a total solids content of 20 wt % was then added at the liquifier tank (7). After all of the curd had been added, 83 pounds of sodium tripolyphosphate was added at the liquifier tank (7) and recirculation was allowed to proceed for five minutes to allow sufficient time for the mixture to blend. Thereafter, the liquifier tank (7) and scraped surface heat exchanger (10) were turned off and the recirculation loop was shut down. The mixture was then allowed to sit quiescently for 30 minutes to allow the emulsifying salt to interact with the protein.

After the period of quiescence, the recirculation loop was restarted and the product was warmed to 145° F. by introducing warm water into the jackets of the liquifier tank (7), scraped surface heat exchanger (10) and processing tank (4). During the first heating process, the following dry ingredients were added sequentially to the recirculating product at the liquifier tank (7):

| DRY INGREDIENT | POUNDS |
| --- | --- |
| Buttermilk solids | 42.0 |
| Salt | 50.0 |
| Sugar | 50.0 |
| Potassium Sorbate | 6.7 |
| Calcium Propionate | 6.7 |
| Titanium Dioxide | 41.7 |
| Corn syrup solids | 240.0 |

Annatto extract was then added for color. Vitamin A palmitate was added to adjust the vitamin A level to that of regular cream cheese. Warming of the product was facilitated by setting the agitation speed of the liquifier tank (7) and processing tank (10) on low speed (approximately 1200 rpm).

After a temperature of 145° F. had been reached and the aforementioned dry ingredients has been added and blended, 67 lbs of xanthan gum as stabilizing hydrocolloid was slowly introduced into the liquifier tank (7) as recirculation proceeded and the second heating period commenced. When the temperature of the product reached 160° F. at the end of the second heating period, the liquifier (7) was turned on high speed (2400 rpm) for a period of eight minutes to activate the xanthan gum. Activation of xanthan gum results in the product taking on the appearance of bread dough. After xanthan activation, 12.5 pounds of carrageenan and 42 pounds of modified food starch were added while the liquifier was left on high speed.

After sufficient blending of all ingredients, the liquifier tank (7) was turned to low speed (1200 rpm) as the product was heated a third and final time to 165° F. at a rate of approximately 2° F./min. The product was then homogenized at a total pressure of 2500 psi and transferred to a surge tank for packaging. Fat-free bar cream cheese was packaged in a heat-sealed, foil pouches encased in paper cartons.

The resultant fat free cream cheese product had a lactose content of 4.75% wt., a casein content of 14.0% wt and a pH value of 5.0. The product produced by the inventive process exhibited a rich cultured flavor and a body and texture which closely resembled traditional cream cheese.

EXAMPLE 2

PREPARATION OF A SOFT FAT FREE CREAM CHEESE BY THE INVENTIVE PROCESS

In this Example, soft fat free cream cheese having high levels of lactose was prepared by the process of the present invention. The target range for lactose in this example is 5.00% wt. to 8.00% wt., based on the weight of the final product. The casein content range is 11% wt to 13% wt, based on the weight of the final product.

Whole milk (3048 lbs.) was separated into cream and skim milk using a mechanical skim separator. The separated skim milk (2762 lbs.) was then fortified with nonfat dry milk to a solids content of 25% wt., and the resulting mixture was pasteurized then cooled to 72° F. The resulting material (3402 lbs.) was then transferred into a culture silo. A commercial dairy starter culture containing *Lactococcus lactis* subsp. *cremoris*, *Leuconostoc mesenteroides* subsp. *cremoris*, and *Lactococcus lactis* subsp. *lactis* biovar diacetylactis (2% wt.) was added to the skim milk mixture and fermentation was allowed to proceed at 72° F. until the pH reaches 4.9. This process took about 18 hours. Thereafter, the fortified skim milk was cooled to 40° F. and was held at this temperature for 48 hours for proper flavor development. This resulted in a flavor-rich material which will be referred to here as a precheese base.

Precheese base (3402 lbs) was introduced into a 1000 gallon processing tank (4) (Walker, model P/Z-K/T-34) which was connected to a liquifier tank (7) (volume 300 gal., Breddo, model LORWWSS) and scraped surface heat exchanger (10) (APV Crepaco, model No. 2HD672) in a recirculating loop configuration as shown in FIG. 1. The liquifier tank (7) was turned on low speed (1200 rpm), as recirculation of the precheese base commences. Heat was not applied at the scraped surface heat exchanger (10) during this recirculation period. Dry cottage cheese curd (4050 lbs) having a total solids content of 20 wt % was then added at the liquifier tank (7). After all of the curd had been added, 65 pounds of sodium tripolyphosphate were added at the liquifier tank (7) and recirculation was allowed to proceed for five minutes to comminute the dry curd. Thereafter, the liquifier tank (7) and scraped surface heat exchanger (10) were turned off and the recirculation loop was shut down. The mixture was then allowed to sit quiescently for 30 minutes to allow the emulsifying salt to interact with the protein.

After the period of quiescence, the recirculation loop was restarted and the product was warmed to 145° F. by introducing warm water into the jackets of the liquifier tank (7), scraped surface heat exchanger (10), and processing tank (4). During the first heating period, the following dry ingredients were added sequentially to the recirculating product at the liquifier tank (7):

| DRY INGREDIENT | POUNDS |
| --- | --- |
| Buttermilk solids | 203 |
| Salt | 48 |
| Sugar | 48 |
| Potassium Sorbate | 6.5 |
| Calcium Propionate | 6.5 |
| Titanium Dioxide | 40.5 |

Annatto extract was added for color. Vitamin A palmitate was added to adjust the vitamin A level to that of regular cream cheese. Warming of the product was facilitated by setting the agitation speed of the liquifier tank (7) and processing tank (4) on low speed (approximately 1200 rpm).

After a temperature of 145° F. had been reached and the aforementioned dry ingredients had been added and blended, 65 pounds of xanthan gum as stabilizing hydrocolloid was slowly introduced into the liquifier tank (7) as recirculation proceeded and the second heating period commences. When the temperature of the product reached 160° F. at the end of the second heating period, the liquifier tank (7) was turned on high speed (2400 rpm) for a period of eight minutes to activate the xanthan gum. Activation of xanthan gum results in the product taking on the appearance of bread dough. After xanthan activation, 12.5 pounds of carrageenan was added while the liquifier was left on high speed.

After sufficient blending of all ingredients, the liquifier tank (7) was turned to low speed (1200 rpm) as the product was heated a third and final time to 170° F. at a rate of approximately 2° F./min. The product was then homogenized at a total pressure of 2500 psi and transferred to a surge tank for packaging. The fat-free cream cheese was packaged in heat-sealed, foil pouches encased in paper cartons.

The resultant fat-free cream cheese product had a lactose content of 7.0% wt., a casein content of 13.0% wt. and a pH value of 5.0. The product produced by the process described in this example exhibited a rich cultured flavor and a body and texture which closely resembled spreadable full-fat cream cheese.

While the fundamental novel features of the invention has been shown and described, it will be understood that various omissions, substitutions and changes in the form and details illustrated may be made by those skilled in the art without departing from the spirit of the invention. It is the intention, therefore, to be limited only as indicated by the scope of the following claims.

What is claimed is:

1. A process for making a cultured fat-free cream cheese product comprising the steps of:
    (a) inoculating a pasteurized mixture comprising skim milk fortified with a casein-containing fortification agent, said pasteurized mixture having a solid matter content ranging between about 24% wt. and about 28% wt., with a dairy starter culture so as to form an inoculated mixture;
    (b) fermenting said inoculated mixture at a temperature ranging between about 68° F. and about 110° F. so as to obtain a fermented mixture having a pH ranging between about 4.7 and about 5.0;
    (c) cooling said fermented mixture to a temperature ranging between about 35° F. and about 45° F. and allowing said fermented mixture to sit at said temperature for a period ranging between about 24 and about 96 hours so as to produce a flavor-rich precheese base;
    (d) introducing a predetermined amount of said precheese base into a processing tank (4), said processing tank (4) being connected to a liquifier tank (7) in a recirculation loop comprising a processing tank (4), valve (5), positive displacement pump (6), liquifier tank (7), valve (8), positive displacement pump (9), scraped surface heat exchanger (10), and valve (11);
    (e) adding dry cottage cheese curd in an amount ranging between about 30% wt. and about 70% wt. and an emulsifying salt in an amount ranging between about 0.25% wt. and about 2.0% wt. into said liquifier tank (7) while recirculating said precheese base in said recirculating loop for a period ranging between about 3 and about 15 minutes and a temperature ranging between about 40° F. and about 80° F. so as to form a blended mixture;
    (f) allowing the blended mixture to sit quiescently at said temperature for a period ranging between about 15 minutes and about 60 minutes;
    (g) subjecting the blended mixture of step (f) to a first heating step wherein a temperature ranging between about 130° F. and about 160° F. is achieved with said recirculating look;
    (h) adding a predetermined amount of bulking agents, preservatives, coloring agents, sugar, and salt to said mixture of step (g) while said mixture is recirculated during the first heating step;
    (i) subjecting the mixture of step (h) to a second heating step to a temperature ranging between about 150° F. and about 175° F.;
    (j) adding a predetermined amount of stabilizing hydrocolloid during second heating step (i);
    (k) shearing the mixture of step (j);
    (l) adding a predetermined amount of carrageenan to the sheared mixture;
    (m) subjecting the mixture of step (l) to a third and final heating step to a temperature ranging between about 160° F. and about 180° F.; and
    (n) homogenizing said mixture at a homogenization pressure ranging between about 1500 and about 3000 psi.

2. The process according to claim 1, wherein said dairy starter culture comprises *Lactococcus lactis* subsp. *cremoris*, *Leuconostoc mesenteroides* subsp. *cremoris*, and *Lactococcus lactis* subsp. *lactis* biovar diacetylactis.

3. The process according to claim 1, wherein step (e) dry cottage cheese curd ranges between about 40% wt. and about 60% wt.

4. The process according to claim 1, wherein step (e) emulsifying salt ranges between about 0.5% wt. and about 1% wt.

5. The process according to claim 1, wherein step (e) dry cottage cheese curd is replaced with cultured skim milk solids.

6. The process according to claim 1, wherein step (e) period is about 5 minutes.

7. The process according to claim 1, wherein step (f) said period is about 30 minutes.

8. The process according to claim 1, wherein step (g) temperature is about 145° F.

9. The process according to claim 1, wherein step (h) bulking agents comprise corn syrup solids, maltodextrins, caseinates, nonfat dry milk, cultured skim milk product, or other milk solids.

10. The process according to claim 1, wherein step (h) preservative comprises calcium propionate, potassium sorbate or sorbic acid.

11. The process according to claim 1, wherein said step (h) coloring agent comprises titanium dioxide or annato.

12. The process according to claim 1, wherein step (i) temperature is about 160° F.

13. The process according to claim 1, wherein step (i) stabilizing hydrocolloid comprises xanthan gum, modified food starch, carrageenan, agar, alginate, or locust bean gum.

14. The process according to claim 1, wherein step (j) stablizing hydrocolloid is xanthan gum.

15. The process according to claim 1, wherein step (k) shearing occurs for between about three and about 10 minutes.

16. The process according to claim 1, wherein step (l) further comprises adding modified food starch.

17. The process according to claim 1, wherein step (l) carrageenan is present in an amount ranging between about 0.1wt % and about 0.4wt %.

18. The process according to claim 1, wherein step (m) temperature is 165° F.

19. The process according to claim 1, wherein said fat free cream cheese product has a lactose content ranging between about 3% wt. and about 7% wt. based on the product weight.

20. The process according to claim 1, wherein said amount of precheese base in step (d) ranges between about 25wt % and about 55wt %.

21. The process according to claim 1, further comprising packaging the product.

22. Fat free cream cheese product produced by the process of claim 1.

* * * * *